F. G. LEE.
HEADLIGHT LENS.
APPLICATION FILED JULY 30, 1917.
1,274,173.
Patented July 30, 1918.
2 SHEETS—SHEET 1.
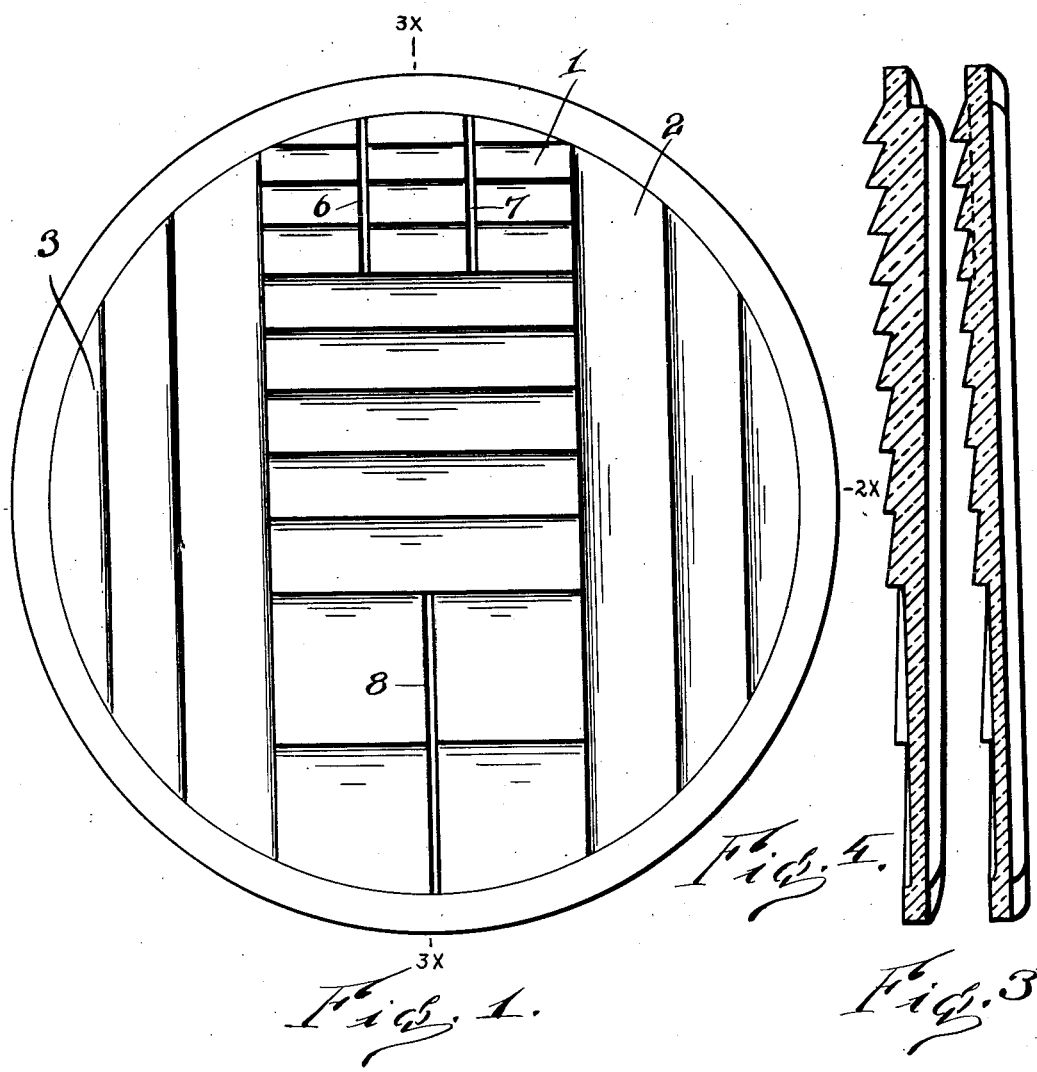

F. G. LEE.
HEADLIGHT LENS.
APPLICATION FILED JULY 30, 1917.

1,274,173.

Patented July 30, 1918.
2 SHEETS—SHEET 2.

Witness
Eric Ochinger

Inventor
Frederick G. Lee
By Frank Keifer
Attorney

UNITED STATES PATENT OFFICE.

FREDERICK G. LEE, OF ROCHESTER, NEW YORK.

HEADLIGHT-LENS.

1,274,173.

Specification of Letters Patent.    Patented July 30, 1918.

Application filed July 30, 1917.  Serial No. 183,601.

*To all whom it may concern:*

Be it known that I, FREDERICK G. LEE, a citizen of the United States, residing at Rochester, in the county of Monroe and State of New York, have invented certain new and useful Improvements in Headlight-Lenses, of which the following is a specification.

The object of this invention is to provide a new and improved headlight lens for the headlights of automobiles or other vehicles and for other purposes.

Another object of the invention is to direct the rays of light so that they will fall on the road that is to be traveled thus concentrating and saving and applying the light most effectively.

These and other objects of the invention will be fully illustrated in the drawing, described in the specification and pointed out in the claims at the end thereof.

In the drawings:

Figure 1 is a rear elevation of my improved lens.

Fig. 2 is a horizontal section on the line $2^x$—$2^x$ of Fig. 1, the top of the figure showing the front of the lens and the bottom of the figure showing the rear of the lens.

Fig. 3 is a vertical section on the line $3^x$—$3^x$ of Fig. 1.

Fig. 4 is a vertical section of the lens corresponding to Fig. 3 with the central zone of the lens made thick at the top and tapering to the bottom.

In the drawing like reference numerals indicate like parts.

Figure 5:
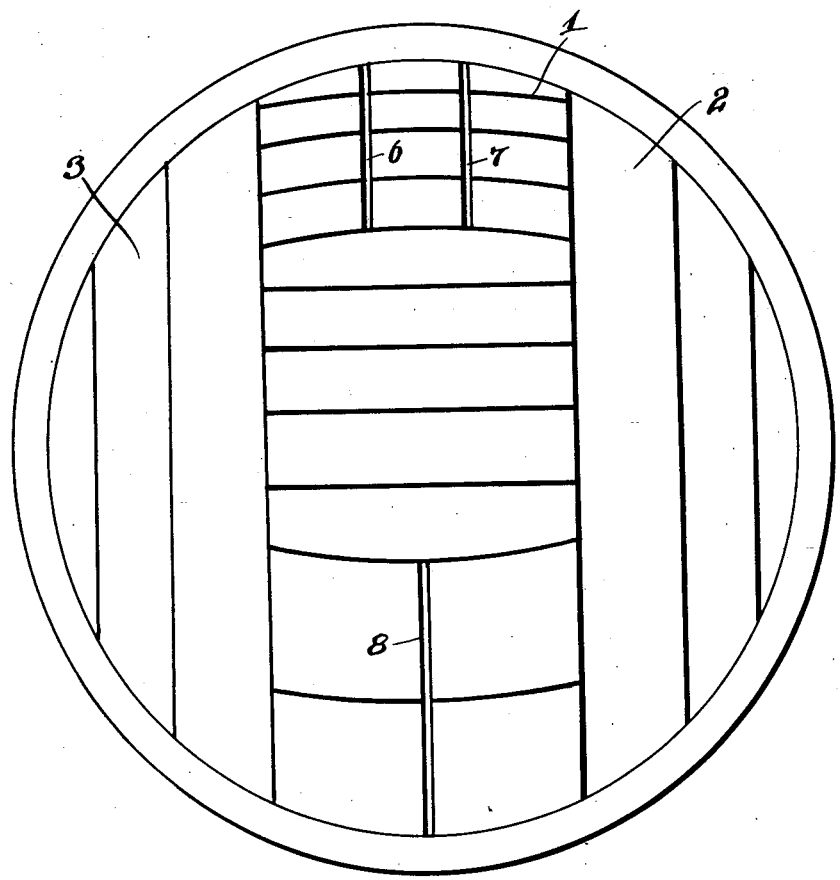
Fig. 5 is a rear elevation of a modified form of my lens in which the prisms at the top and bottom of the central zone are curved concave with respect to the center of the lens.

Headlights for automobiles, locomotives, trolley cars, conveyances and other purposes as commonly constructed are provided with parabolic or spherical mirrors behind the source of light. The rays coming from such a light while approximately parallel are caused to slightly diverge in all directions to give a wider field of illumination because the source of light is between the focus and the mirror. This flaring of the rays in all directions is adapted to illuminate the ground and obstructions on the road, both straight ahead and to the right and left, but it results in a waste of all those rays which have an upward direction. This not only makes a large portion of the light useless, but it also introduces a possible disadvantage because the light rays that are wasted have a blinding effect on the pedestrians or occupants of vehicles who are approaching the headlight from the front.

If on the other hand the rays from such headlights are greatly concentrated into a pencil, as in search lights, they will illuminate only a small and insufficient area of a road or track and will not enable the operator to observe obstacles in time to avoid them and it is subject to the further objection of producing too great a contrast between the portions of the road or tract that are illuminated and the portions that are not illuminated.

The object of my invention is to provide a headlight with a lens for deflecting the rays toward the ground so that the light which would flare upwardly and laterally will be saved and made to illuminate the roadway in front of the machine at any distance that may be desired.

To this end I provide a headlight having the usual mirror and a light properly placed therein with a glass front therefor composed of prisms to deflect the rays of light toward the ground. This glass front or lens is composed of a central zone 1 made up of a series of horizontal prisms, preferably twelve in number, extending transversely thereto. On either side of this zone is a segment which completes the circle, the segment on the right being number 2 and the segment on the left being number 3. Each of these segments is composed of three vertical prisms as are shown in the section of Fig. 2.

The prisms are all placed on the back of the lens to protect them against the dust of the road. This makes it easier to clean the lens and gives a better projection of the light rays.

In front of the central zone 1 is a concave cylindrical surface generated around a vertical axis and in front of the segmental prisms 2 and 3 is also a concave cylindrical surface generated around a vertical axis or axes a longer radius being used in laying out the curvature for the concave surfaces of the segments 2 and 3 than is used for the concave surface of the zone 1.

The prisms in the zone 1 gradually increase in width and decrease in angular pitch from the top toward the bottom as will be seen from an inspection of the first ten prisms shown in Fig. 3. The eleventh prism is made much wider than any of the other prisms above it with comparatively low pitch and the twelfth prism of the zone is finished with but a small prismatic elevation.

The prisms of the segments 2 and 3 are wider at the central zone of the lens and are narrower at the rim of the lens. Three of these prisms are shown in each segment as is shown in Fig. 2, the innermost prism having the greatest width, the outermost prism being the narrowest in width and the intermediate prism having an intermediate width. The number of the prisms in both the central zone and the segments on either side thereof may be varied at will.

The lens is finished with a rim 4 by which it is fastened to the frame or front door of the lens and this rim forms a shoulder 5 with the back of the lens.

For ornamental purposes and to diminish the tendency to glare above a certain line, the slots 6 and 7 are cut in the horizontal prisms at the top of the central zone 1, which slots extend only to the bottom of the prisms and do not go clear through the lens. The slot 8 is cut in the prisms at the bottom for a like purpose. These slots cut the long prisms into two or three short prisms and cause them to give a better transmission and distribution of light and decreases the tendency to glare in wrong direction.

As the prisms at the top have a great angle they will deflect the light which would otherwise flare upwardly from the mirror and throw it downward on the road, and the prisms below them will have the same effect to a lesser degree, so that the net result of all the prisms in the central zone will prevent any light from flaring upwardly and will cause all of the light to be thrown out and downwardly.

The concave front of the central zone will cause the light rays to emerge from the central zone of the lens almost parallel or with a considerably diminished horizontal divergence, so that the intense light is concentrated on a comparatively narrow part of the road even at a considerable distance from the lamp.

The prisms on either side of the central zone will in like manner bend the rays back into parallel paths instead of permitting them to diverge, in which respect the prisms are aided by the concave front of the segments, with the net result that the light which passes through the segments is diverted to and thrown upon that part of the road which is illuminated by the central zone so that all three parts of the lens coöperate to illuminate the entire roadway brilliantly from a few feet in advance of the car to as great a distance in front of the car as the light can carry, which will by many hundreds of feet.

It will also be understood that there will be a considerable diffusion of light that passes through the lens, causing a moderate illumination on either side of the bright illumination that is secured by the lens.

It will also be understood that when the lamp is properly set the brilliant illumination does not reach higher than the height of the lens itself above the ground so that the brilliant concentrated rays are not thrown into the eyes of a person of ordinary height as they look at the approaching car, only a moderate illumination being produced above the top of the lamp, the intense illumination being directed to the ground over a great length in front of the lamp.

Because of the greater distance between the light and the upper corners of the central zone the refraction will not be as great from the corners and there may be a little tendency to glare upwardly at those corners. This tendency can be corrected by increasing the thickness of the lens at the top back of the central zone so that the concave face at the top will be inclined forward and will slope rearwardly toward the bottom or it can be corrected by curving one or more of the upper prisms of the central zone as is shown in Fig. 5 or by a combination of these two expedients.

I claim:

1. A lens having one of its surfaces formed with a central zone and a zone at each side thereof, said central zone being composed of prisms which successively increase in width and decrease in refractive power from top to bottom of the lens, and said side zones being formed of prisms extending longitudinally at right angles to the prisms of the central zone and decreasing in width and increasing in refractive power from the central zone toward the side of the lens.

2. A lens, a face of which is formed of prisms, the prisms at the central portion of said face being at right angles to those at the other side thereof, the prisms at the central and side portions of the lens increasing in width and decreasing in refractive power, and decreasing in width and increasing in refractive power, respectively, from the circumference toward the center of the lens.

3. A lens, a face of which is formed of prisms, the prisms at the central portion of said face being at right angles to those at the other side thereof, the prisms at the central and side portions of the lens increasing in width and decreasing in refractive power, and decreasing in width and increasing in refractive power, respectively, from the circumference toward the center of the lens, said lens having its opposite face concaved.

In testimony whereof I affix my signature.

FREDERICK G. LEE.